June 13, 1961 W. H. PUCKETT ET AL 2,988,380
TRAILER HOUSE SKIRT
Filed April 16, 1959
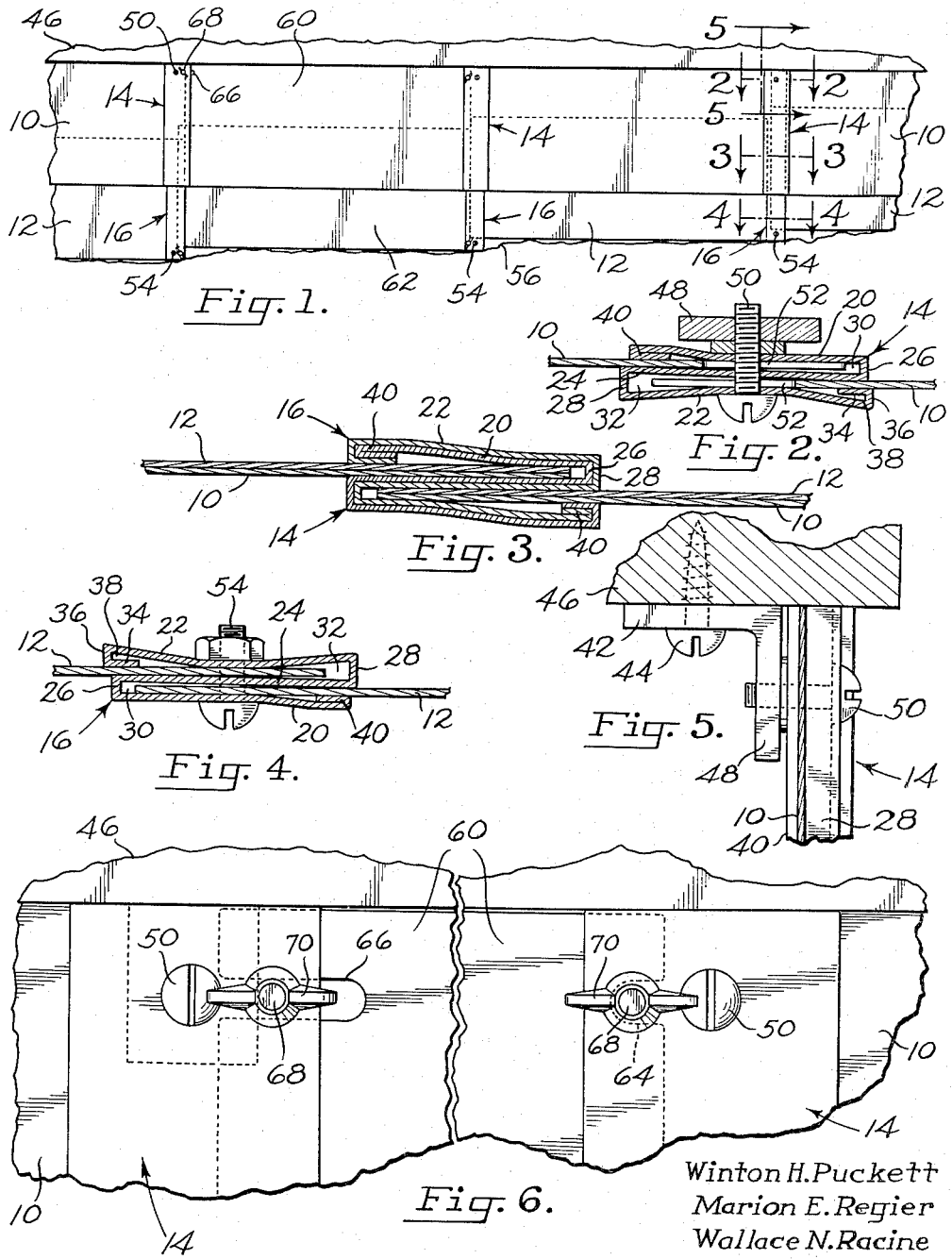
Winton H. Puckett
Marion E. Regier
Wallace N. Racine
INVENTORS
BY Oliver D. Olson
Agent

2,988,380
TRAILER HOUSE SKIRT

Winton H. Puckett, 10635 SE. Center St., Portland, Oreg., Marion E. Regier, Box 85, Canby, Oreg., and Wallace N. Racine, 8258 NE. Holladay, Portland, Oreg.

Filed Apr. 16, 1959, Ser. No. 806,818
7 Claims. (Cl. 280—150)

This invention relates to trailer house skirts for enclosing the space between the ground and the trailer house floor, for purposes of shielding the floor from drafts, providing an enclosed storage area and improving the appearance of the trailer house.

It is a principal object of this invention to provide a trailer house skirt which is adjustable in height to accommodate variations in height between the ground and the trailer house floor.

Another important object of the present invention is to provide a trailer house skirt in the form of a plurality of longitudinally interconnected and vertically adjustable panel sections, to accommodate installation upon trailer houses of various sizes and to accommodate variations in height between the ground and the trailer house floor.

Still another important object of this invention is the provision of a trailer house skirt which includes a novel door section by which to gain access to the space enclosed by the skirt.

A further important object of this invention is to provide a trailer house skirt which is collapsible to minimum size for convenient storage during transport of the trailer.

A still further important object of this invention is the provision of a trailer house skirt which is of simplified construction for economical manufacture, and which may be installed upon and removed from a trailer house with maximum speed and facility.

The foregoing and other objects and advantages of this invention will appear from the following detailed description, taken in connection with the accompanying drawing, in which:

FIG. 1 is a fragmentary view in side elevation of a trailer house skirt embodying the features of the present invention, the same being shown mounted upon a trailer house which is supported upon uneven ground;

FIG. 2 is a fragmentary sectional view taken along the line 2—2 in FIG. 1;

FIG. 3 is a fragmentary sectional view taken along the line 3—3 in FIG. 1;

FIG. 4 is a fragmentary sectional view taken along the line 4—4 in FIG. 1;

FIG. 5 is a fragmentary sectional view taken along the line 5—5 in FIG. 1;

FIG. 6 is a fragmentary foreshortened view in side elevation showing a structural arrangement for a door section in the trailer house skirt of FIG 1.

In its basic concept, the trailer house skirt of this invention comprises a plurality of vertically adjustable panel sections secured at their upper ends to the trailer house and interconnected at their adjacent ends to form a peripheral enclosure.

In the embodiment illustrated, each panel section includes an upper panel 10 and a lower panel 12, preferably placed behind the upper panel and adjustable vertically with respect to the upper panel. The panel sections are interconnected at their adjacent ends by means of telescoping connectors, there being a connector 14 for the adjacent ends of upper panels and a separate connector 16 for the adjacent ends of lower panels.

In the preferred form illustrated, the upper and lower connectors are identical in cross sectional configuration, but rotated 180° relative to each other for telescopic interconnection. Thus, each connector is formed to include a pair of transversely spaced, substantially parallel outer sections 20, 22 and intermediate section 24. One longitudinal edge of the intermediate section is connected to the adjacent longitudinal edge of the outer section 20 through the web 26, and the other longitudinal edge of the intermediate section is connected to the adjacent edge of the other outer section 22 through the web 28. This arrangement provides a pair of laterally spaced slots 30 and 32 which open toward opposite sides of the connector. Thus, the cross sectional shape of the connector is substantially in the form of an S or, when the connector is reversed end for end as illustrated in the drawing, is substantially in the form of an inverted S.

In the preferred embodiment illustrated, the pair of connectors preferably are arranged to interlock telescopically to prevent relative lateral displacement while permitting relative longitudinal adjustment. This is provided in the embodiment illustrated by the inwardly spaced flange 34 connected through the web 36 to the longitudinal edge of the outer section 22 opposite the web 28. The flange and web provide a locking groove 38 proportioned to receive slidably therein the rolled longitudinal edge 40 of the other outer section 20 opposite the web 26.

In the embodiment illustrated, the web 28 is substantially twice the width of the other web 26, providing a slot 32 substantially twice the width of the other slot 30. Thus, the wider slot 32 of each connector receives slidably therein the section of the other connector defining the narrower slot 30, while both of the narrower slots receive slidably therein the upper and lower panels 10, 12 of adjacent panel sections.

Means is provided for securing the upper connector 14 of each pair to the trailer house. In the embodiment illustrated, such means is provided by an L-shaped bracket, one section 42 of which is apertured to receive a securing screw 44 which is adapted to be anchored in the trailer house floor 46. The other depending section 48 of the bracket is provided with a tapped opening to receive the securing bolt 50 which extends through aligned openings in the outer and intermediate sections of the upper connector 14 and through aligned, horizontally elongated slots 52 provided in the adjacent ends of the upper panels 10. A washer may be interposed between the bracket section 48 and the adjacent outer section 20 of the connector, as illustrated.

Similar openings are provided in the lower connector 16 adjacent the lower end thereof for releasably securing the lower panels 12 together. It will be understood that the upper and lower panels are identical and, by inversion, the horizontally extending slots 52 in the upper panels will appear at the lower end of the lower panels for receiving the bolts 54.

In the installation illustrated in FIG. 1, wherein the trailer house is supported upon sloping terrain 56, it will be seen that only the right hand slot 52 in each lower panel 12 aligns with the openings in the lower connector for receiving the bolt 54. The left hand end of the lower panel is elevated above the bolt, but is retained securely when the bolt is drawn tight.

Means preferably is provided for gaining access to the interior of the space enclosed by the trailer house skirt. In the embodiment illustrated, this is provided by a pair of upper and lower door panels 60 and 62, respectively, which are similar to the remaining panels with the exception that they are shorter in horizontal length. This is best illustrated in FIG. 6, wherein it is shown that the upper door panel 60 is shorter in length than the distance between the securing bolts 50. One end of the upper door panel is provided with a horizontally extending slot 64, preferably of a length sufficient only to center the door panel between a pair of the upper connectors 14. The opposite end of the upper door panel is provided with a longer slot 66, of sufficient length to permit movement of the upper door panel in that direction a distance sufficient to draw the opposite end of the panel out of its associated connector 14. Then, by moving the panel in the opposite direction it is removed completely from the associated connectors to produce an opening. Suitable securing bolts 68, such as those illustrated and provided with wing nuts 70, are mounted in aligned openings in the connectors 14 and the slots in the upper door panel, for securing the assembly together. Similar bolts may be provided adjacent the lower ends of the lower connectors 16, for securing the lower door panel 62.

In the installation of the trailer house skirt described hereinbefore, the sections 42 of the L-shaped brackets are secured at spaced intervals to the underside of the trailer house floor 46, by the screws 44, and the upper connector 14 of each telescopic pair is secured to the bracket section 48 successively as each pair of panels is mounted in place. The corner panels merely are bent at the corners of the trailer house. If the trailer house dimensions are such that the last panel section to be installed is of shorter length than the other panels, this is accommodated simply by cutting the panels to proper length and reforming the horizontal slots 52. The door section may be provided at any desirable location, in the manner explained hereinbefore.

Various changes may be made in the details of construction described hereinbefore. For example, the locking grooves 38 may be eliminated and the connector formed as an integral part of its associated panel. Thus, for example, the panel 10 extending toward the left in FIG. 2 may be provided as an extension of the outer section 20 of the connector 14, and the panel 12 extending to the right in FIG. 4 may be formed as an extension of the outer section 20 of the lower connector 14. Appropriate reduction is made in the thickness of the slots 30 for receiving the free end of the other panel forming a panel section. The panel sections may be formed of more than two panels, by providing additional telescoping sections of connectors, it being understood that the intermediate connectors and panels are to be secured together by securing bolts.

These and various other modifications and changes may be made, as desired, without departing from the spirit of this invention and the scope of the appended claims.

Having now described our invention and the manner in which the same may be used, what we claim as new and desire to secure by Letters Patent is:

1. A trailer house skirt comprising a plurality of panel sections adapted to be arranged side by side, each panel section including upper and lower panels arranged in vertically adjustable overlapping relation, means detachably securing the upper panels to a trailer house, and adjustment means connecting adjacent ends of adjacent panel sections together and permitting said vertical adjustment of the lower panel relative to the upper panel to enclose the space between the trailer house and the ground.

2. The trailer house skirt of claim 1 wherein the adjustment means comprises a plurality of vertically elongated connectors each providing oppositely directed slots adapted to releasably receive the adjacent ends of adjacent panel sections.

3. The trailer house skirt of claim 2 including a door section between a pair of spaced connectors and having the same number of door panels as there are panels in each skirt panel section, the door panels being shorter in horizontal length than the distance between centers of the pair of connectors, whereby to permit horizontal movement of the door panels for their installation in and removal from said connectors.

4. The trailer house skirt of claim 1 wherein the adjustment means comprises a plurality of elongated vertically adjustable connectors each associated with the corresponding panels of adjacent panel sections and each providing oppositely directed slots adapted to releasably receive adjacent ends of panels in adjacent panel sections.

5. The trailer houser skirt of claim 4 including means on the connectors for securing them together telescopically and to prevent their relative lateral displacement.

6. The trailer house skirt of claim 4 including a door section between a pair of spaced connectors and having the same number of door panels as there are panels in each skirt panel section, the door panels being shorter in horizontal length than the distance between centers of the pair of connectors, whereby to permit horizontal movement of the door panels for their installation in and removal from said connectors.

7. The trailer house skirt of claim 1 wherein the adjustment means includes connecting means engaging lower adjacent panels for adjusting said panels individually to different vertical positions to conform to ground irregularities.

References Cited in the file of this patent

UNITED STATES PATENTS

| | | |
|---|---|---|
| 2,126,499 | Petersen | Aug. 9, 1938 |
| 2,618,493 | Fransen et al. | Nov. 18, 1952 |
| 2,737,267 | Koch | Mar. 6, 1956 |
| 2,741,306 | Warp | Apr. 10, 1956 |